(12) United States Patent
Zhu (10) Patent No.: US 11,189,911 B2
(45) Date of Patent: Nov. 30, 2021

(54) COMPACT COMBINER FOR PHASED-ARRAY ANTENNA BEAMFORMER

(71) Applicant: Tubis Technology Inc., Pasadena, CA (US)

(72) Inventor: Siqi Zhu, Pasadena, CA (US)

(73) Assignee: Tubis Technology INC., San Diego, CA (US)

( * ) Notice: Subject to any disclaimer, the term of this patent is extended or adjusted under 35 U.S.C. 154(b) by 51 days.

(21) Appl. No.: 16/386,449

(22) Filed: Apr. 17, 2019

(65) Prior Publication Data

US 2019/0326664 A1 Oct. 24, 2019

Related U.S. Application Data

(60) Provisional application No. 62/659,463, filed on Apr. 18, 2018.

(51) Int. Cl.
*H01Q 1/24* (2006.01)
*H01Q 3/38* (2006.01)
*H01Q 1/52* (2006.01)
*H04W 16/28* (2009.01)
*H01Q 21/22* (2006.01)

(52) U.S. Cl.
CPC .............. *H01Q 1/246* (2013.01); *H01Q 1/247* (2013.01); *H01Q 1/523* (2013.01); *H01Q 3/38* (2013.01); *H01Q 21/22* (2013.01); *H04W 16/28* (2013.01)

(58) Field of Classification Search
CPC ........ H01Q 1/246; H01Q 1/247; H01Q 1/523; H01Q 21/22; H01Q 3/38; H04W 16/28
See application file for complete search history.

(56) References Cited

U.S. PATENT DOCUMENTS

| | | | |
|---|---|---|---|
| 9,570,792 B1* | 2/2017 | Derbyshire | ............ H03H 7/383 |
| 2009/0295500 A1* | 12/2009 | Ives | ............ H01P 5/16 333/128 |
| 2010/0245177 A1* | 9/2010 | Jagielski | ............ H01Q 1/243 343/702 |
| 2016/0365617 A1* | 12/2016 | Vickes | ............ H03H 7/48 |
| 2019/0260138 A1* | 8/2019 | Gu | ............ H01Q 21/0075 |

* cited by examiner

*Primary Examiner* — Muthuswamy G Manoharan
(74) *Attorney, Agent, or Firm* — Imperium Patent Works; Zheng Jin (57) ABSTRACT

A method of implementing a combiner or divider network with compact layout design is proposed. A phased-array antenna comprises a plurality of antenna elements, a plurality of phase shifters, and a combiner and/or divider network. The phased-array antenna is capable of forming narrowly focused beams. The array of antenna elements is applied with a set of combined beam coefficients to steer the direction of the beam and to shape the beamwidth to a desired width. The combiner and/or divider network is implemented with a compact layout design, where each combiner or divider in the network is designed with a flexible terminal location to fit different circuits easily to reduce trace loss in the network and to reduce the overall layout size.

21 Claims, 5 Drawing Sheets

COMPACT COMBINER FOR PHASED-ARRAY ANTENNA BEAMFORMER

CROSS REFERENCE TO RELATED APPLICATIONS

This application claims priority under 35 U.S.C. § 119 from U.S. Provisional Application No. 62/659,463, entitled "Compact Combiner for Phased-Array Antenna Beamformer," filed on Apr. 18, 2018, the subject matter of which is incorporated herein by reference.

TECHNICAL FIELD

The disclosed embodiments relate generally to wireless network communications, and, more particularly, to phased-array antenna beamformer design in wireless communications systems with beamforming.

BACKGROUND

The bandwidth shortage increasingly experienced by mobile carriers has motivated the exploration of the underutilized Millimeter Wave (mmWave) frequency spectrum around 30 G and 300 G Hz for the next generation broadband cellular communication networks. The available spectrum of mmWave band is hundreds of times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

A receive phased-array antenna includes a combiner network, which is formed by multiple combiners. Similarly, a transmit phased-array antenna includes a divider network, which is formed by multiple dividers. A passive divider network is structurally the same as a combiner network. Under phased-array antenna operation, the array pattern=Element Gain*Array Factor (good approximation for scanning angel of interest). It is desirable to have a smooth element pattern that covers the array field of view (FoV). Phased-array antenna elements are generally placed in regular grid points (rectangular grid or hexagonal placement). For microwave, mmWave, or higher frequencies, it is important to place active circuits (e.g., low noise amplifiers (LNAs), power amplifiers (PAs), combiners, dividers, or phase shifters) very close to the antenna elements to reduce trace loss and to reduce performance degradation. However, this imposes restrictions on the active circuit implementation.

A solution of combiner and divider network implementation with improved phased-array antenna layout area efficiency is sought.

SUMMARY

A method of implementing a combiner or divider network with compact layout design is proposed. A phased-array antenna comprises a plurality of antenna elements, a plurality of phase shifters, and a combiner and/or divider network. The phased-array antenna is capable of forming narrowly focused beams. The array of antenna elements is applied with a set of combined beam coefficients to steer the direction of the beam and to shape the beamwidth to a desired width. The combiner and/or divider network is implemented with a compact layout design, where each combiner or divider in the network is designed with a flexible terminal location to fit different circuits easily to reduce trace loss in the network and to reduce the overall layout size.

In one embodiment, a phased-array antenna receives or transmits a radio signal over a directional beam using a plurality of antenna elements. The antenna applies a plurality of phase shift values to the plurality of antenna elements. Each antenna element is applied with a phase shift value to receive or transmit the radio signal over the directional beam. A combiner or divider network combines or divides the radio signal using a plurality of combiners or dividers. Each combiner or divider comprises input and output terminals, and the input and output terminals of each combiner or divider are placed with a flexible location to reduce a two-dimensional layout size of the phased-array antenna.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
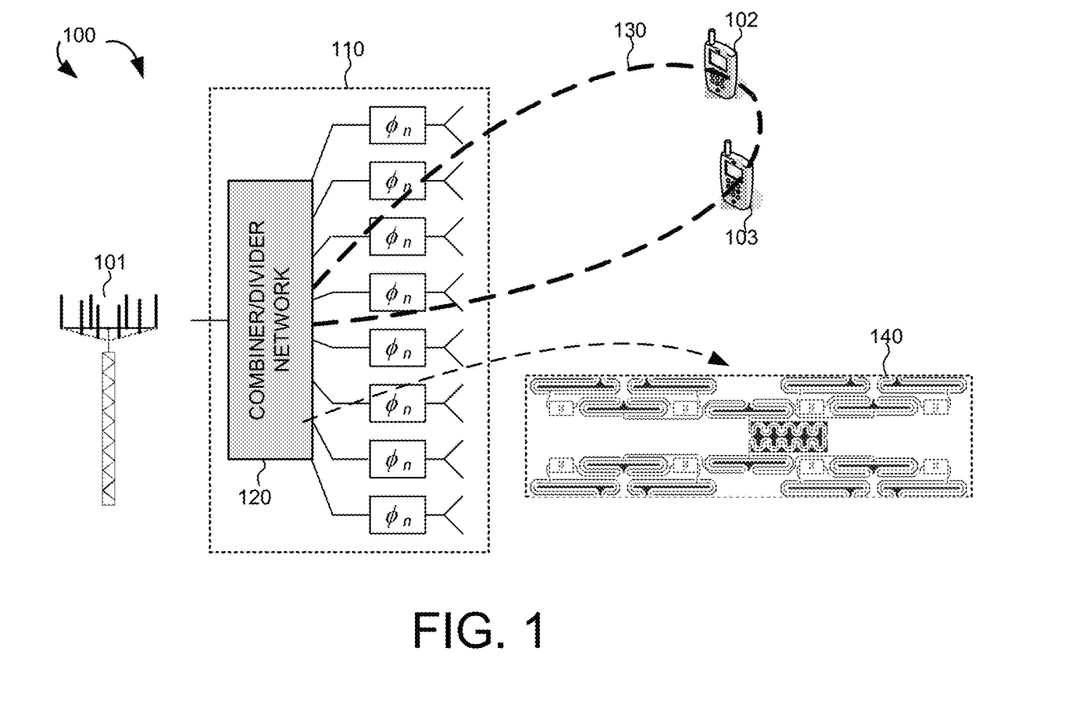
FIG. 1 illustrates a wireless device having a phased-array antenna for transmitting or receiving a directional beam in a beamforming cellular communication network in accordance with a novel aspect.

FIG. 1 illustrates a wireless device 101 having a phased antenna array for transmitting or receiving a directional beam in a beamforming cellular communication network 100 in accordance with one novel aspect. Beamforming cellular mobile communication network 100 comprises a base station BS 101 and a first user equipment UE 102 and a second user equipment UE 103. The cellular network uses directional communications with narrow beams and can support multi-gigabit data rate. One example of such cellular network is a Millimeter Wave (mmWave) network utilizing the mmWave frequency spectrum. In such mmWave network, directional communications are achieved via beamforming, wherein a phased antenna array having multiple antenna elements are applied with multiple sets of beamforming weights (phase shift values) to form multiple beam patterns.

In the example of FIG. 1, BS 101 is directionally configured with a set of coarse TX/RX control beams and a set of dedicated TX/RX data beams to serve mobile stations including UE 102 and UE 103. Typically, the collection of the control beams covers an entire service area of a serving cell, and each control beam has a wider and shorter spatial coverage with smaller array gain. Each control beam in turn is covered by a set of dedicated data beams. The collection of the dedicated data beams covers a service area of one control beam, and each dedicated data beam has a narrower and longer spatial coverage with larger array gain. The set of control beams provides low rate control signaling to facilitate high rate data communication on dedicated data beams. Similarly, UE 102 and UE 103 may also apply beamforming to from multiple beam patterns to transmit and receive radio signals.

In antenna theory, a phased antenna array usually means an array of antennas that creates a beam of radio waves can be electronically steered to point in different directions, without moving the antennas. In the phased antenna array, the radio frequency current from the transmitter is fed to the individual antennas with the correct phase relationship so that the radio waves from the separate antennas add together to increase the radiation in a desired direction, while cancelling to suppress radiation in undesired directions. In the phased antenna array, the power from the transmitter is fed to the antennas through phase shifters, controlled by a processor, which can alter the phase electronically, thus steering the beam of radio waves to a different direction.

A receive phased-array antenna includes a combiner network, which is formed by multiple combiners. Similarly, a transmit phased-array antenna includes a divider network, which is formed by multiple dividers. A passive divider network is structurally the same as a combiner network. Under phased-array antenna operation, the array pattern=Element Gain*Array Factor (good approximation for scanning angel of interest). It is desirable to have a smooth element pattern that covers the array field of view (FoV). Phased-array antenna elements are generally placed in regular grid points (rectangular grid or hexagonal placement). For microwave, mmWave, or higher frequencies, it is important to place active circuits (e.g., low noise amplifiers (LNAs), power amplifiers (PAs), combiners, dividers, or phase shifters) very close to the antenna elements to reduce trace loss and to reduce performance degradation. However, this imposes restrictions on the active circuit implementation.

In according with one novel aspect, a method of implementing a combiner or divider network with compact layout design is proposed. In the example of FIG. 1, BS 101 comprises a phased-array antenna 110, which comprises a plurality of antenna elements, a plurality of phase shifters, and a combiner and/or divider network 120. The phased-array antenna 110 is capable of forming narrowly focused beam such as beam 130. The antenna elements are applied with a set of combined beam coefficients $\Phi n$ to steer the direction of the beam and to shape the beamwidth to a desired width. The combiner and/or divider network 120 is implemented with a compact layout design, as depicted by 140, where each combiner or divider in the network is designed with a flexible terminal location to fit different circuits easily to reduce trace loss in the network and to reduce the overall layout size.

Figure 2:
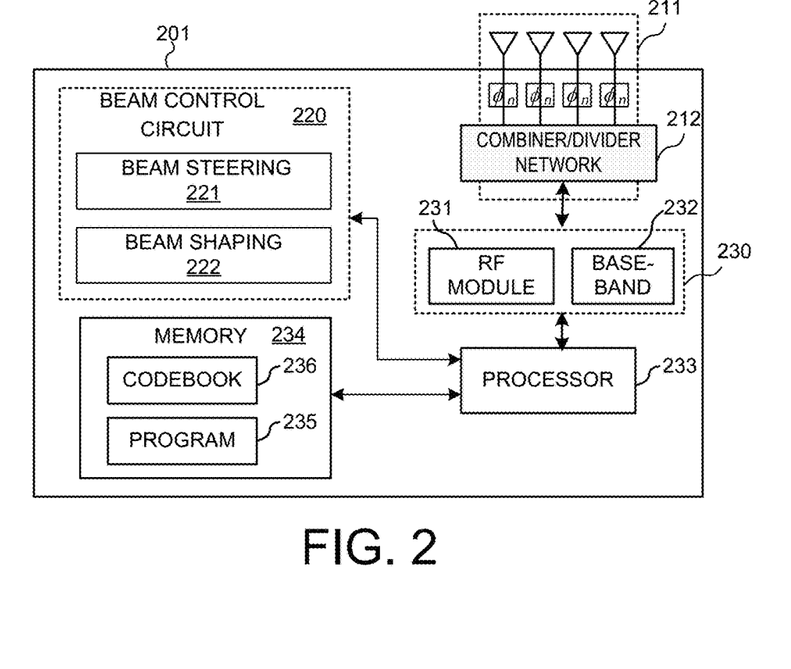
FIG. 2 is a simplified block diagram of a wireless transmitting device or a receiving device that carry out embodiments of the present invention.

FIG. 2 is a simplified block diagram of a wireless device 201 that carries out certain embodiments of the present invention. Device 201 has a phased-array antenna 211 having multiple antenna elements and a combiner and/or divider network 212 that transmits and receives radio signals, a transceiver 230 comprising one or more RF transceiver modules 231 and a baseband processing unit 232, coupled with the phased-array antenna, receives RF signals from antenna 211, converts them to baseband signal, and sends them to processor 233. RF transceiver 231 also converts received baseband signals from processor 233, converts them to RF signals, and sends out to antenna 211. Processor 233 processes the received baseband signals and invokes different functional modules and circuits to perform features in device 201. Memory 234 stores program instructions and data 235 and codebook 236 to control the operations of device 201. The program instructions and data 235, when executed by processor 233, enables device 201 to apply various beamforming weights to multiple antenna elements of antenna 211 and form various directional beams for communication.

Device 201 also includes multiple function modules and circuits that carry out different tasks in accordance with embodiments of the current invention. The functional modules and circuits can be implemented and configured by hardware, firmware, software, and any combination thereof. For example, device 201 comprises a beam control circuit 220, which further comprises a beam direction steering circuit 221 that steers the direction of the beam and a beamwidth shaping circuit 222 that shapes the beamwidth of the beam. Beam control circuit 220 may belong to part of the RF chain, which applies various beamforming weights to multiple antenna elements of antenna 211 and thereby forming various beams. Based on phased array reciprocity or channel reciprocity, the same receiving antenna pattern can be used for transmitting antenna pattern. In one example, beam control circuit 220 applies additional phase modulation to the original phase shift values that form a directional beam pattern with a desirable width. Beam steering circuit 221 applies the original phase shift values that form a directional narrow beam pattern. Beam shaping circuit 222 applies the additional phase modulation that expands the narrow beam pattern to a desirable width. Memory 234 stores a multi-antenna precoder codebook 236 based on the parameterized beamforming weights as generated from beam control circuit 220. In one novel aspect, the phased-array antenna 211 including the combiner or divider network is implemented with a compact layout design, where each combiner or divider in the network is designed with a flexible terminal location to fit different circuits easily to reduce trace loss in the network and to reduce the overall layout size.

Figure 3:
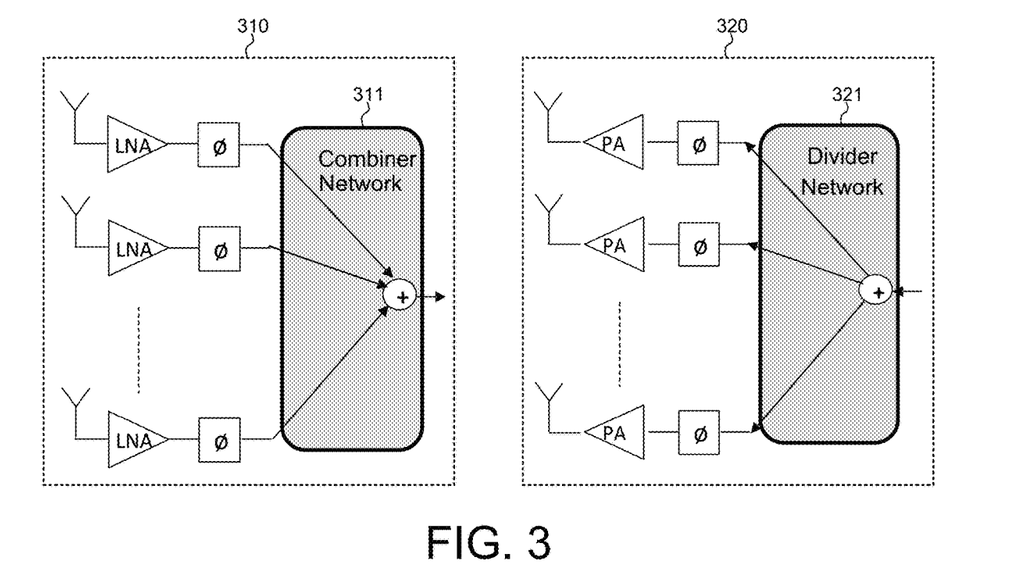
FIG. 3 illustrates a simplified block diagram of a phased-array receiving antenna and a phased-array transmitting antenna that carry out embodiments of the present invention.

FIG. 3 illustrates a simplified block diagram of a phased-array receiving antenna 310 and a phased-array transmitting antenna 320 that carry out embodiments of the present invention. Phased-array receiving antenna 310 comprises a plurality of antenna elements, a plurality of low noise amplifiers (LNAs), a plurality of phase shifters, and a combiner network 311. Radio signals are received through the antenna elements, through the LNAs, through the phase shifters, and are then combined by combiner network 311 for processing. Similarly, phased-array transmitting antenna 320 comprises a plurality of antenna elements, a plurality of power amplifiers (PAs), a plurality of phase shifters, and a divider network 321. The divider network 321 takes an input signal and divides to a plurality of output signals, which are transmitted through the phase shifters, through the PAs, and are then transmitted out via the antenna elements. In one novel aspect, the phased-array antenna is implemented with a compact layout design to reduce trace loss in the network and to reduce the overall layout size.

Figure 4:
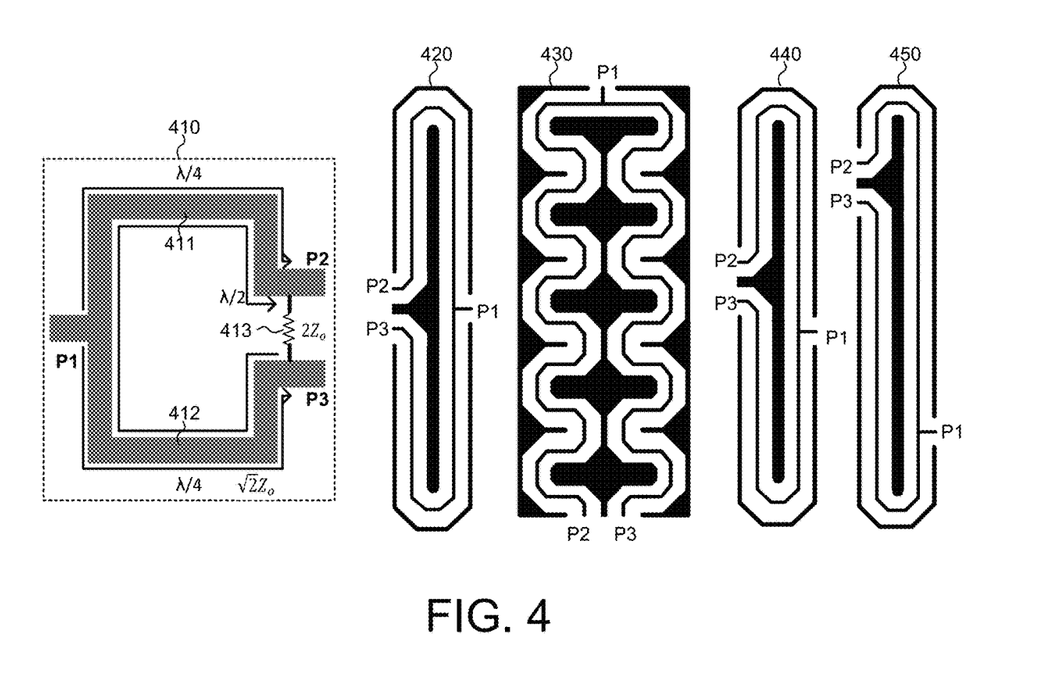
FIG. 4 illustrates a binary Wilkinson Combiner and corresponding layout design in accordance with one novel aspect of the present invention.

FIG. 4 illustrates a binary Wilkinson Combiner 410 and corresponding layout design in accordance with one novel aspect of the present invention. The Wilkinson power combiner or divider is a well-known device in the RF/microwave community used for combining or splitting signals. It is composed of simple transmission lines and a resistor, and takes advantage of the properties of quarter-wavelength transmission line sections to provide ideal power combiner or divider characteristics. The Wilkinson power combiner or divider provides isolation between the input or output terminals, is capable of being matched at all terminals and becomes lossless when the input or output terminals are matched.

In the example of FIG. 4, the design of the binary Wilkinson combiner 410 has a first input terminal P2, a second input terminal P3, and a third output terminal P1. The combiner 410 is composed of a transmission line that has been split into two transmission lines 411 and 412, each one quarter-wavelength long. A resistor 413 is connected between the two input terminals or transmission lines. When the input terminals P2 and P2 are connected to matched loads for an equal split, the voltages along each input transmission line are of the same magnitude and phase. This causes the connecting resistor to have no voltage drop across it, and consequently, dissipate no power. The necessary impedance of each quarter-wave transmission line is equal to the characteristic impedance of the input terminal (e.g., z0) multiplied by a factor of $\sqrt{2}$. Additionally, the resistor that connects the two input terminals is equal to the characteristic impedance of the output terminal (e.g., z0) multiplied by a factor of two. These impedances allow the inputs of the combiner to be isolated and matched, while also allow the output of the combiner to be matched.

FIG. 4 also illustrates corresponding layout design implementations of the binary Wilkinson combiner 410 in accordance with one novel aspect. In a first example, as depicted by layout 420, input terminals P2 and P3 are located in the middle of the combiner at the left side, while output terminal P1 is located in the middle of the combiner at the right side. In a second example, as depicted by layout 430, input terminals P2 and P3 are located in the middle of the combiner at the bottom side, while output terminal P1 is located in the middle of the combiner at the top side. In the first and the second example, the layout design is traditional where the location of the output terminal is symmetric with respect to the input terminals.

In a third example, as depicted by layout 440, input terminals P2 and P3 are located slightly toward the top of the combiner at the left side, while output terminal P1 is located slightly toward the bottom of the combiner at the right side. In a fourth example, as depicted by layout 440, input terminals P2 and P3 are located near the top of the combiner at the left side, while output terminal P1 is located near the bottom of the combiner at the right side. In the third and the fourth example, the layout design is flexible where the location of the output terminal is asymmetric with respect to the input terminals. Such flexible terminal location is advantageous to form a combiner network layout with overall reduced trace loss and reduced layout size. Note that although FIG. 4 uses a combiner as an example, the same implementation is applicable for a divider. Instead of having two input terminals and one output terminal for combiner, each divider has one input terminal and two output terminals, and the terminal locations of each divider are flexible to form a divider network with reduced trace loss and reduced layout size.

Figure 5:
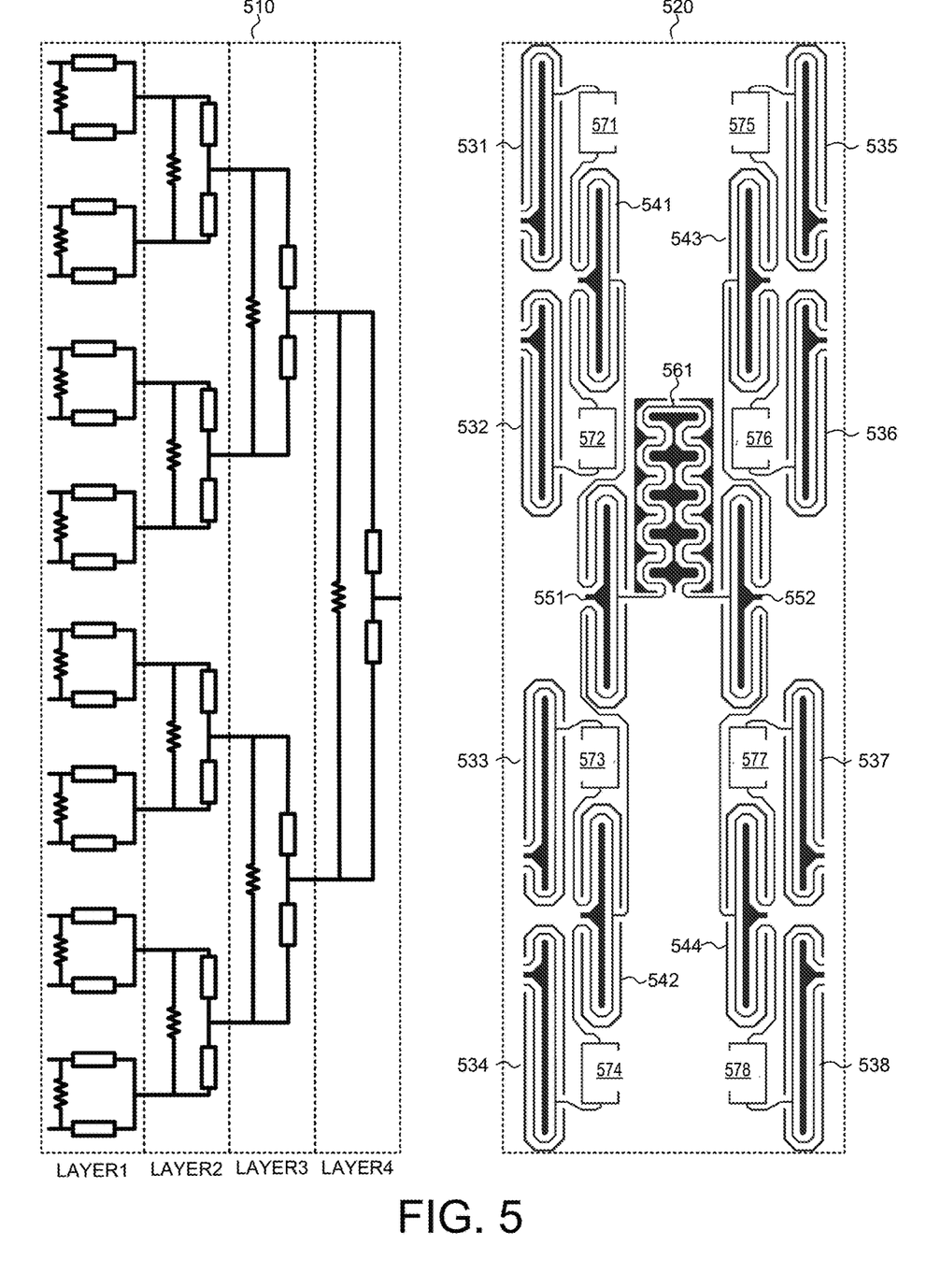
FIG. 5 illustrates a 16-to-1 combiner network constructed with cascade binary combiners and corresponding layout design in accordance with one novel aspect of the present invention.

FIG. 5 illustrates a 16-to-1 combiner network 510 constructed with cascade binary combiners and corresponding layout design in accordance with one novel aspect of the present invention. The 16-to-1 combiner network 510 is constructed with four layers of cascade binary combiners. In a first layer, eight combiners having 16 input terminals are connected to 16 antenna elements for receiving radio signals. Each of the eight combiners output a combined signal to be output to an output terminal, which is coupled to eight input terminals of a second layer of four combiners. The second layer of four combiners combines the eight input signals via the eight input terminals and output four output signals to four output terminals. The output terminals of the second layer combiners are coupled to four input terminals of a third layer of two combiners, which combines four input signals and output two output signals. Finally, the two output terminals of the third layer combiners are coupled to the two input terminals of a fourth layer combiner. Finally, the fourth layer combiner combines two input signals and output one output signal for later processing.

The 16-to-1 combiner network 510 has a corresponding layout implementation as depicted by 520. In the example of FIG. 5, the 16-to-1 combiner network 510 is constructed with four layers of cascade binary combiners—combiners 531-538 are the eight first layer of binary combiners; combiners 541-544 are the four second layer of binary combiners; combiners 551-552 are the two third layer of binary combiners; and combiner 561 is the fourth layer of combiner. Note that for the first layer of combiners, the input terminals of combiners 531, 533, 535 and 537 are located near the bottom of the left side of the combiners, while the output terminals of combiners 531, 533, 535 and 537 are located near the top of the right side of the combiners; on the contrary, the input terminals of combiners 532, 534, 536 and 538 are located near the top of the left side of the combiners, while the output terminals of combiners 532, 534, 536 and 538 are located near the bottom of right side of the combiners. For the second, third, and fourth layers of combiners, both input and output terminals are located in the middle of the combiners either at the left, right, top, or bottom side, and the combiners have different shapes.

Different combiners have flexible input and output terminal positions and different shapes. As a result, such layout design has the following benefits. First, the different combiners can be shaped to fit into a small implementation area by adjusting the terminal positions and combiner locations. Second, the different shapes and forms are designed to shorten the interconnection trace, and avoid areas used for other circuits. Specifically, the layout design is able to more efficiently fit other active circuits of the combiner network, e.g., buffer amplifiers 571-578 without introducing extra area space, by adjusting the terminal positions and circuit locations. Note the buffer amplifiers are used in the combiner network to compensate for signal loss. Therefore, such area efficient design utilizes the variants of combiner implementation to reduce trace loss in the combiner network and can reduce the overall layout size. Note that although FIG. 5 uses a combiner network as an example, the same implementation is applicable for a divider network.

Figure 6:
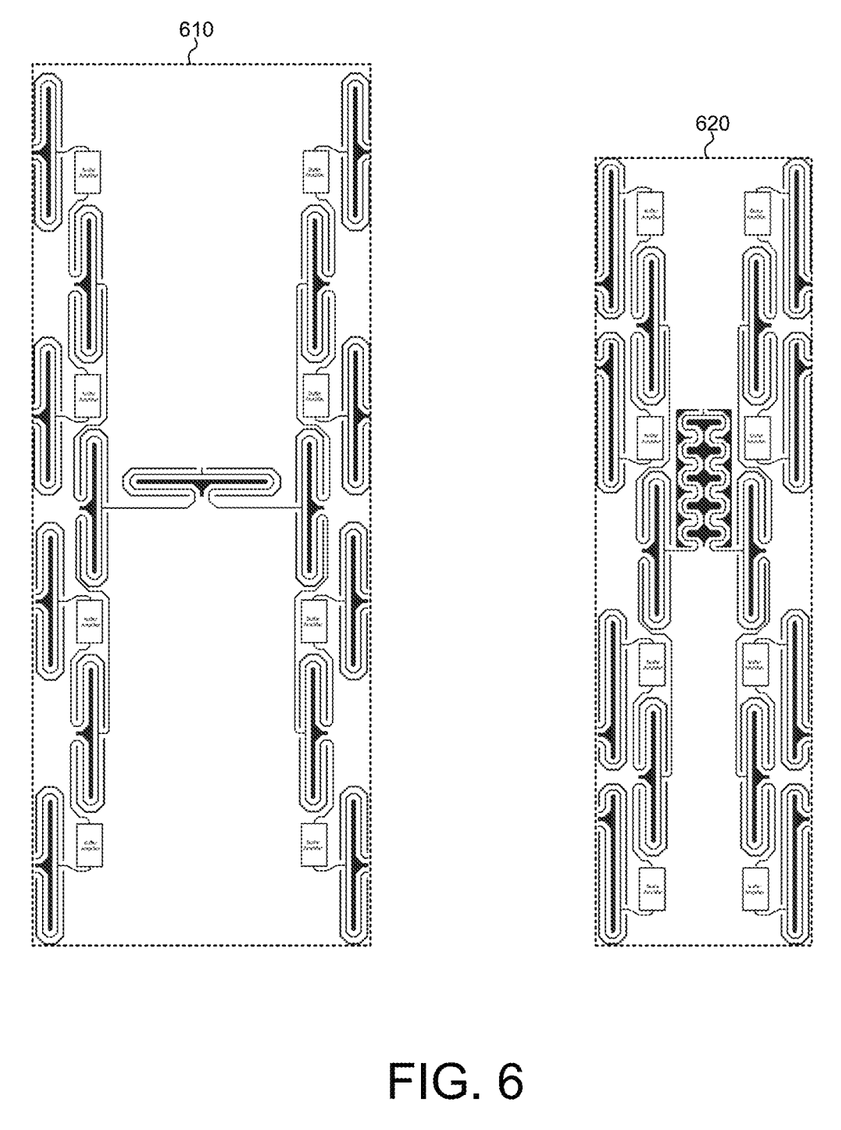
FIG. 6 illustrates a comparison for 16-to-1 combiner networks with traditional layout implementation and with compact layout implementation.

FIG. 6 illustrates a comparison for 16-to-1 combiner networks with traditional layout implementation and with compact layout implementation. The traditional layout design is depicted in 610, where every combiner has fixed input and output terminal locations and the same shape. The compact layout design is depicted in 620, where each combiner has different terminal positions and shapes. The terminal positions and the combiner shape are flexible and varies to more efficiently fit other circuits of the combiner network. As a result, the compact layout design utilizes the variants of combiner implementation to reduce trace loss in the combiner network and can reduce the overall layout size by 10-20%.

Figure 7:
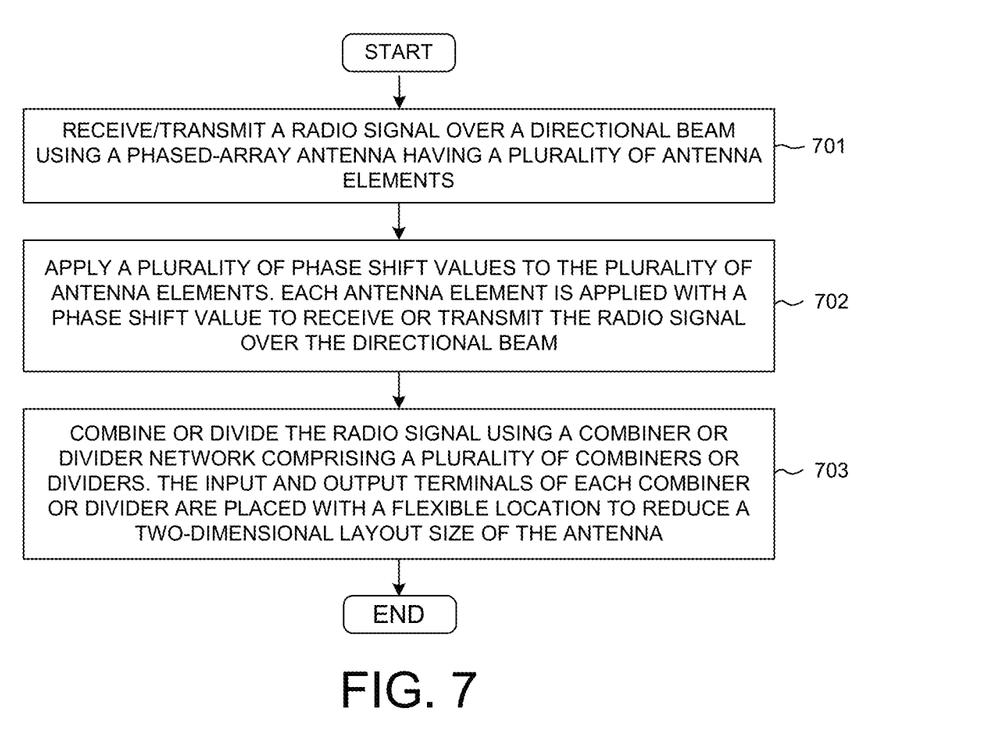
FIG. 7 is a flow chart of a method of implementing a combiner or divider network with compact layout design in accordance with one novel aspect.

FIG. 7 is a flow chart of a method of implementing a combiner or divider network with compact layout design in accordance with one novel aspect. In step 701, a phased-array antenna receives or transmits a radio signal over a directional beam using a plurality of antenna elements. In step 702, the antenna applies a plurality of phase shift values to the plurality of antenna elements. Each antenna element is applied with a phase shift value to receive or transmit the radio signal over the directional beam. In step 703, a combiner or divider network combines or divides the radio signal using a plurality of combiners or dividers. Each combiner or divider comprises input and output terminals, and the input and output terminals of each combiner or divider are placed with a flexible location to reduce a two-dimensional layout size of the phased-array antenna.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A phased-array antenna, comprising:
a plurality of antenna elements; and
a combiner network comprising a plurality of combiners coupled to the plurality of antenna elements for receiving input signals, wherein the combiner network outputs a combined signal, and wherein each combiner comprises:
   a first input terminal, a second input terminal, and a third output terminal, and each terminal having an impedance of z0;
   a first transmission line coupled to the first input terminal and the third output terminal;
   a second transmission line coupled to the second input terminal and the third output terminal; and
   an isolation resistor, wherein the third output terminal is placed with a flexible location to reduce a layout size of the combiner network that refers to a two-dimensional area occupied by the plurality of combiners, wherein the layout size of the combiner network is reduced by adjusting the location of the third output terminal of each combiner without changing a size of each corresponding combiner.

2. The antenna of claim 1, wherein each transmission line is approximately a quarter-wavelength long at a frequency of operation, and each transmission line has an impedance of $\sqrt{2}*z0$.

3. The antenna of claim 1, wherein each isolation resistor having an impedance of $2*z0$.

4. The antenna of claim 1, wherein each combiner is a binary Wilkinson Combiner, and wherein the combiner network is a $2^N$-to-1 combiner network formed by N layers of binary Wilkinson Combiners.

5. The antenna of claim 1, wherein for at least one combiner, a location of the third output terminal is asymmetric with respect to locations of the first and the second input terminals.

6. The antenna of claim 1, wherein the layout size is reduced by adjusting the location of the third output terminal to fit one or other component(s).

7. The antenna of claim 6, wherein the other component(s) is another combiner, an amplifier, or a phase shifter of the phased-array antenna.

8. The antenna of claim 1, wherein different combiners have different terminal layout locations to reduce trace loss in the combiner network.

9. A phased-array antenna, comprising:
a plurality of antenna elements; and
a divider network comprising a plurality of dividers coupled to the plurality of antenna elements for transmitting output signals, wherein the divider network receives an input signal, and wherein each divider comprises:
   a first input terminal, a second output terminal, and a third output terminal, and each terminal having an impedance of z0;
   a first transmission line coupled to the first input terminal and the second output terminal;
   a second transmission line coupled to the first input terminal and the third output terminal; and
   an isolation resistor, wherein the first input terminal is placed with a flexible location to reduce a layout size of the divider network that refers to a two-dimensional area occupied by the plurality of dividers, wherein the layout size of the divider network is reduced by adjusting the location of the first input terminal of each divider without changing a size of each corresponding divider.

10. The antenna of claim 9, wherein each transmission line is approximately a quarter-wavelength long at a frequency of operation, and each transmission line has an impedance of $\sqrt{2}*z0$.

11. The antenna of claim 9, wherein each isolation resistor having an impedance of $2*z0$.

12. The antenna of claim 9, wherein each divider is a binary Wilkinson Divider, and wherein the divider network is a $2^N$-to-1 divider network formed by N layers of binary Wilkinson Dividers.

13. The antenna of claim 9, wherein for at least one divider, a location of the first input terminal is asymmetric with respect to locations of the second and the third output terminals.

14. The antenna of claim 9, wherein the layout size is reduced by adjusting the location of the first input terminal to fit one or other component(s).

15. The antenna of claim 14, wherein the other component(s) is another divider, an amplifier, or a phase shifter of the phased-array antenna.

16. The antenna of claim 9, wherein different dividers have different terminal layout locations to reduce trace loss in the divider network.

17. A method, comprising:
receiving or transmitting a radio signal over a directional beam using a phased-array antenna having a plurality of antenna elements;
applying a plurality of phase shift values to the plurality of antenna elements, wherein each antenna element is applied with a phase shift value to receive or transmit the radio signal over the directional beam; and
combining or dividing the radio signal using a combiner or divider network comprising a plurality of combiners or dividers, wherein each combiner or divider comprises input and output terminals, and wherein the input and output terminals of each combiner or divider are placed and adjusted with a flexible location to reduce a layout size of the combiner or divider network without changing a size of each corresponding combiner or divider, wherein the layout size of the combiner or divider network refers to a two-dimensional area occupied by the plurality of combiners or dividers.

18. The method of claim 17, wherein for at least one combiner, a location of an output terminal is asymmetric with respect to locations of two input terminals.

19. The method of claim 17, wherein for at least one divider, a location of an input terminal is asymmetric with respect to locations of two output terminals.

20. The method of claim 17, wherein the layout size is reduced by adjusting locations of the terminals to fit other components of the antenna.

21. The method of claim 17, wherein different combiners or dividers have different terminal layout locations to reduce trace loss in the combiner or divider network.

\* \* \* \* \*